United States Patent [19]

Linden

[11] Patent Number: 4,796,919
[45] Date of Patent: Jan. 10, 1989

[54] VEHICLE SEATBELT DEFLECTION DEVICE

[76] Inventor: Scott R. Linden, 16044 Outer Bear Valley Rd., Victorville, Calif. 92392

[21] Appl. No.: 143,639

[22] Filed: Jan. 12, 1988

[51] Int. Cl.⁴ .................. A47C 31/00; B60R 35/00
[52] U.S. Cl. ................................. 280/808; 297/483
[58] Field of Search ............... 280/801, 808; 297/468, 297/483

[56] References Cited

U.S. PATENT DOCUMENTS

| Re. 32,448 | 6/1987 | Anderson | 280/808 |
|---|---|---|---|
| 3,860,261 | 1/1975 | Takada | 297/483 |
| 4,056,282 | 11/1977 | Nordh | 297/389 |
| 4,236,755 | 12/1980 | Pollitt et al. | 280/808 |
| 4,289,352 | 9/1981 | Ashworth | 280/808 |
| 4,343,489 | 8/1982 | Suzuki et al. | 280/804 |
| 4,456,283 | 6/1984 | Forkel et al. | 280/804 |
| 4,470,618 | 9/1984 | Ono | 280/808 |
| 4,491,344 | 1/1985 | Fonl | 280/808 |
| 4,550,933 | 11/1985 | Patterson | 280/808 |
| 4,571,001 | 2/1986 | Hakansson | 297/483 |
| 4,573,708 | 3/1986 | Brorsson | 280/808 |
| 4,616,878 | 10/1986 | Fonl | 297/483 |
| 4,634,075 | 1/1987 | Oxley et al. | 280/808 |
| 4,640,550 | 2/1987 | Hakansson | 297/483 |
| 4,652,012 | 3/1987 | Biller et al. | 280/808 |

FOREIGN PATENT DOCUMENTS

| 3532407 | 3/1987 | Fed. Rep. of Germany | 297/468 |
|---|---|---|---|
| 681 | 4/1980 | World Int. Prop. O. | 280/808 |

Primary Examiner—David M. Mitchell
Assistant Examiner—Ross Weaver
Attorney, Agent, or Firm—Fulwider, Patton, Rieber, Lee & Utecht

[57] ABSTRACT

A deflection device attachable to a vehicle lap/shoulder seatbelt below the door post anchorage, free of any attachment to fixed structure of the vehicle, to shorten the length of the shoulder belt portion and dispose it across the chest of a smaller seat occupant such as a child. The attachment prevents relative movement between the shoulder belt portion and the vertical run of the seatbelt located below the door post anchorage.

8 Claims, 1 Drawing Sheet

VEHICLE SEATBELT DEFLECTION DEVICE

TECHNICAL FIELD

The present invention relates to a vehicle seat belt deflection device and more particularly to such a device used to dispose the shoulder belt run at a better angle for smaller seat occupants.

BACKGROUND ART

At the present time the typical vehicle seat belt extends in a substantially vertical run from an outside anchorage fixed to the vehicle floor on one side of the vehicle seat to a door post anchorage which defines a belt redirection or deflection point above the vehicle seat. The belt is slidably redirected by the door post anchorage into a diagonal run constituting a shoulder belt portion. The diagonal run extends to a buckle which is adapted for detachable connection to an inside anchorage fixed to the vehicle floor on the other side of the vehicle seat.

The outside anchorage is typically an inertia retractor which winds up the excess seat belt on a spool when the belt is not in use. A seat occupant can pull or pay out some of the excess seat belt to buckle it in position across his body The retractor allows relatively slow movements by the occupant, such as leaning forward to reach into a glove compartment, but the retractor reacts to sudden vehicles deceleration to grip the belt and prevent it from being pulled out relatively rapidly. This prevents the user from being thrown forward in a vehicle accident. The seatbelt usually also incorporates a lap run which constitutes a continuation of the shoulder belt or diagonal run, with the buckle slidably redirecting the diagonal run across the lap to define the lap run. The lap run is secured to a lap belt anchorage which is fixed to the vehicle floor adjacent the retractor anchorage.

The locations of the door post and seat buckle anchorages are reasonably effective to properly locate the diagonal run across the chest of most adults, but totally ineffective in the case of a smaller seat occupant such as a child. The diagonal run usually passes directly across the neck or face of a child. Furthermore, the normal operation of the seatbelt retractor undesirably allows a child to pull out some belt slack and wriggle out of the restraint of the seatbelt.

A considerable number of devices have been proposed in the prior art to enable relocation of the diagonal run of the seatbelt so that it will pass across the chest of small seat occupants. However, all of the devices known to applicant depend for operation upon modifying the construction and location of the conventional door post anchorage. Some include a track integrally fixed to the door post and mounting a vertically movable traveler. The traveler slidably accepts the seatbelt in the same way as a conventional door post anchorage, but it can be moved downwardly to a new position, and retightened in that position, to lower the belt redirection or deflection point. U.S. Pats. Nos. 4,640,550 (Hakansson), 4,652,012 (Biller et al), 4,470,618 (Ono), and 4,573,708 (Vrorsson) disclose devices of this general type. Such devices require such significant modification to existing door post anchorages that retrofitting them to already manufactured vehicles is not practical. Furthermore, such devices are incapable of selectively disabling the usual seatbelt retractor/pay-out devices. Consequently, small children can circumvent their purpose and escape the restraint of the seatbelt.

DISCLOSURE OF THE INVENTION

According to the present invention, an improved deflection device is provided which is operative to shorten the diagonal run of a seatbelt and dispose it at an angle relative to the vertical run which is suitable to the needs of a smaller seat occupant such as a child. The deflection device preferably comprises a clamp which can be laterally slipped over the vertical and diagonal runs of the seatbelt to fixedly clamp the runs against relative movement. The clamp may include a handle or cam member biased into engagement with one of the runs to maintain the clamping action.

By selecting the point of attachment of the deflection device low enough below the existing conventional door post anchorage, the diagonal run can be made to fall across the chest of a child. This does not require any modification of the existing door post anchorage, and the deflection device is attached only to the seatbelt, free of any attachment to fixed structure of the vehicle. Consequently, the device can be quickly and easily installed for restraining a small child, and equally quickly and easily detached so the seatbelt can be used by an adult.

In some vehicles the present device cannot be used because the vertical run of the seatbelt is not accessible by virtue of location inwardly of a baffle or cover attached to the door post. However, wherever the vertical run is exposed the device can be attached to operate as indicated and to prevent relative movement of the vertical run and paying out of belt slack by a child.

Other aspects and advantages of the present invention will become apparent from the following more detailed description taken in conjunction with the accompanying drawings.

BEST MODE FOR CARRYING OUT THE INVENTION

Figure 1:
FIG. 1 is a perspective view of a child seated in a vehicle, illustrating the prior art seatbelt arrangement which locates the shoulder or diagonal run of the seatbelt across the face of the child.

Referring now to FIG. 1, a combination lap/shoulder seatbelt 10 is illustrated which has a lap belt portion or run 12 and a shoulder belt portion or diagonal run 16. The lap run 12 extends across the lap of the child, and through the loop of a buckle 14. The diagonal run 16 is a continuation of the lap run 12, extending from the buckle 14 diagonally upwardly to a door post anchorage (not shown). The location of the diagonal run 16 is clearly objectionable, falling as it does across the face of the child. The illustrated arrangement is also not able to prevent the child from pulling upon the belt and with-drawing slack from the usual inertia retractor mechanism and thereby escaping the restraint of the seatbelt.

Figure 2:
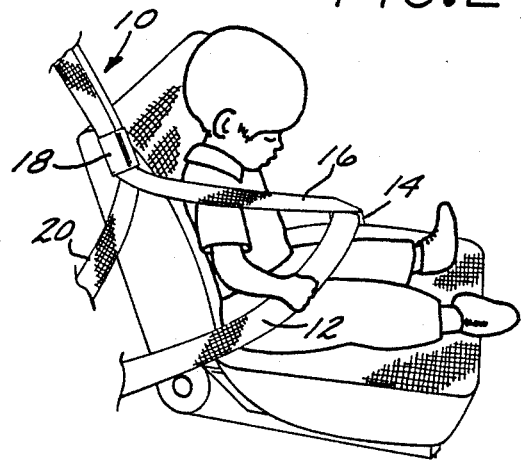
FIG. 2 is a view similar to FIG. 1, but illustrating proper location of the diagonal run across the child's chest through use of the present deflection device.

In FIG. 2 the present deflection device 18 is shown clamping together a vertical run 20 and the diagonal run 16 to prevent relative movement between them. It also redirects or deflects the diagonal run 16 so that it passes across the chest of the child. The device 18 is free of any connection to fixed structure of the vehicle and, as will be seen, its vertical position or height can easily be adjusted. It also can be quickly detached so the seatbelt can be used by an adult.

Figure 3:
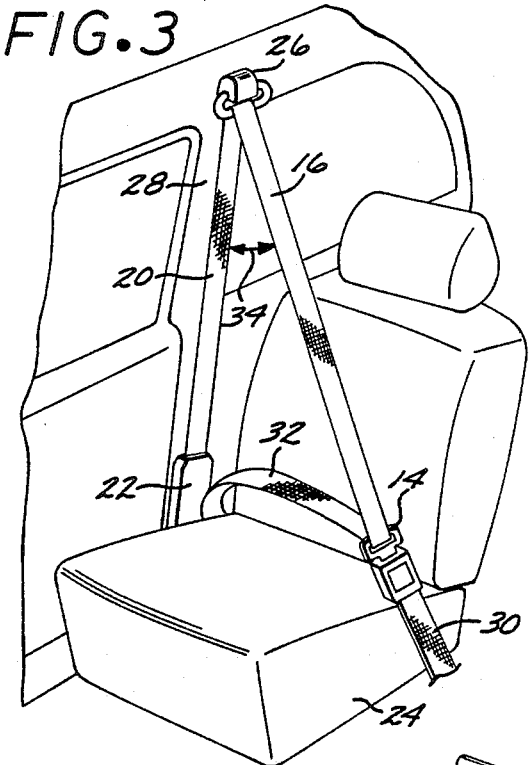
FIG. 3 is an enlarged perspective view of a vehicle prior to installation of the deflection device.
Figure 4:
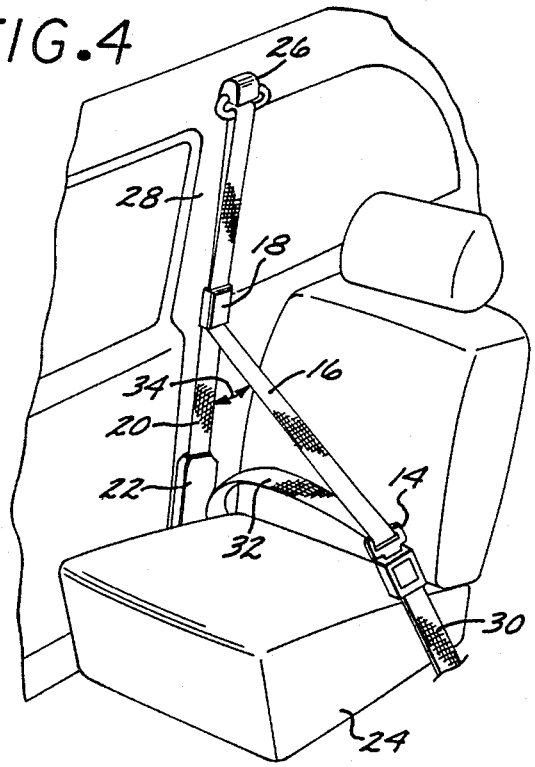
FIG. 4 is a view similar to FIG. 3, but illustrating the deflection device in operative position.
Figure 5:
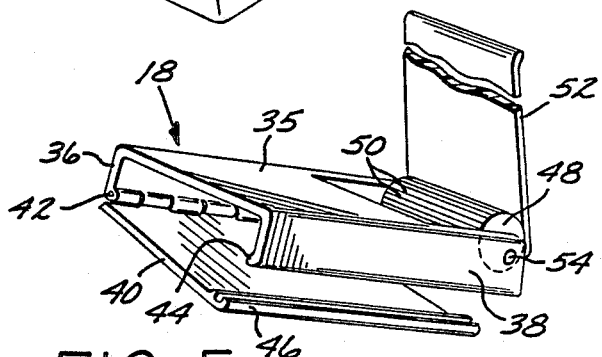
FIG. 5 is a perspective view of one form of deflection device according to the present invention.

Further details of the device and the location of the various anchorages are illustrated in FIGS. 3-5. The vertical run 20 can be seen to extend substantially vertically from an outside anchorage or retractor 22 which is fixed to the vehicle floor on one side of the vehicle seat 24. The run 20 is slidably trained through the closed loop of a door post anchorage 26 which is secured to the vehicle door post 28. The belt is redirected by the anchorage to define the diagonal run 16 which extends to the buckle 14. The buckle is carried by the seatbelt and is detachably connected to an inside anchorage 30 fixed to the vehicle floor on the other side of the seat 24.

The device 18 can be used with a shoulder belt type of seatbelt, but it is illustrated in combination with the more common lap/shoulder type of seatbelt. This type of seatbelt includes a continuous run which slidably passes through a closed loop of the buckle 14. The position of the buckle divides the belt into the lap run 12 and the diagonal run 16. The other end of the lap run 12 is secured to a lapbelt anchorage (not shown) fixed to the vehicle floor adjacent the retractor 22.

Details of the retractor 22, buckle 14 and the various anchorages are omitted for brevity inasmuch as they form no part of the present invention and are well known in the art. However, the retractor 22 is typically an inertia type which includes a spool or reel wound against the bias of a spring so that it always acts to retract excess slack in the belt. When the belt is not in use this positions the lap and diagonal runs against the vertical run 20 in taut, vertically oriented relation.

To use the belt an adult grasps the buckle 14, brings it across his chest and snaps it into a complemental receptacle forming part of the inside anchorage 30. During this procedure the belt pays out from the retractor 22, slides through the post anchorage 26, and divides itself into the runs 16 and 32, according to the size of the occupant, by sliding through the buckle 14.

The conventional door post anchorage 26 is located at a predetermined height to place the diagonal run 16 across the chest of the adult, and at a predetermined angle 34 relative to the vertical run 20. To render the belt useful in restraining a child, the present device 18 is placed in the position illustrated in FIG. 4 to effectively shorten the length of the diagonal run 16 and increase the angle 34. In this position, as will be seen, the device also constrains the runs 20 and 16 against relative movement at the point of attachment. This has the effect of also preventing the upward movement of the vertical run 20 which is necessary to pay out slack from the retractor 22. Consequently, a child cannot lean forward or pull upon the belt runs to wriggle out and escape the constraint of the belt.

One form of deflection device 18 is illustrated in FIG. 5. It comprises a clamp having an elongated, channel shape upper frame member 35 with parallel, oppositely disposed sides or legs 36 and 38. The longitudinal edge of leg 36 includes an interrupted bead defining a plurality of spaced apart hinge knuckles which interfit with similar, complemental hinge knuckles provided in an edge margin of a frame plate 40. The generally rectangular frame plate is coextensive with and pivotally mounted to frame member 35 by a hinge pin 42 which extends through the respective hinge knuckles.

The opposite leg 38 includes an enlarged edge margin or bead 44 adapted to snap fit within a complemental groove provided in a bead 46 at the free edge margin of the plate 40.

When plate 40 is closed against frame member 35, an elongated generally rectangular passageway is defined which is adapted to snugly receive overlying runs of the seatbelt.

The end portion of the frame member 35 is formed or cut away to receive a cylindrical cam member 48 having external grooves or gripping ridges 50. The cam member 48 is pivotable by an integral projecting plate or handle 52, the cam 48 being eccentrically mounted to frame legs 36 and 38 by a hinge pin 54. Bias means (not shown) normally bias the handle 52 from the release position illustrated to a clamping position in which it is coplanar with the frame member 35. In the clamping position the cam member 48 extends into the frame passageway, with the ridges 50 engaged upon one of the two belt runs in the frame passageway to constrain the runs against relative movement.

Assuming the seatbelt is to be redirected to suit a small child, the buckle 14 is snapped into position and the belt run 16 held by hand in the desired position across the child's chest. The end of the redirected, shortened run 16 opposite the buckle 14 is pressed against the vertical run 20 at the height which defines the desired angle 34. The device 18 is then opened, with the handle 52 pulled upwardly against its spring bias, and placed over the belt runs 16 and 20 so that they overlie one another in the frame passageway.

The plate 40 is next snapped shut, the handle 52 allowed to move to its closed position, and the handle then forcibly pressed downwardly to snub the cam member against the overlying belt runs and constrain them against relative movement.

Figure 6:
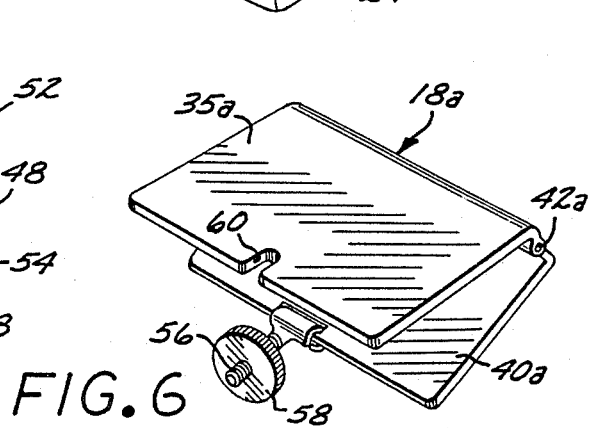
FIG. 6 is a perspective view of another form of deflection device according to the present invention.

Another form of deflection device 18a is illustrated in FIG. 6, the subscript "a" being used to denote structures and elements analogous to those of FIG. 5 bearing corresponding numbers. The device 18a comprises a clamp having generally rectangular upper and lower plate or frame numbers 34a and 40a pivotally secured together at one of their edge margins by a hinge 42a. The corners of the members are preferably rounded so as not to catch on clothing. The inner surfaces of the members are preferably ribbed (not shown) or provided with a non-slip coating to prevent slippage relative to the belt runs.

The member 40a includes a slot within which is pivotally carried the curved end of a threaded post 56. The opposite end of the post threadedly carries an enlarged nut or knob 58. The post is pivotable about the edge margin of the frame member defining the slot, being movable into a slot 60 provided in the frame member 35a.

In operation the device 18a is laterally slipped over the belt runs, and the post 56 is then pivoted from the position illustrated in FIG. 6 to a position in which the knob 58 overlies the slot 60. The knob is then tightened to press against member 36a and thus urge together the frame members 34a and 40a against the belt runs, thereby constraining the belt runs against relative movement.

As will be apparent, the device 18 or 18a can be quickly removed and stored in the glove compartment when the seatbelt is to be used by an adult. When the device is not in place, the inertia retractor mechanism operates in the normal way, permitting the adult to move about, but arresting his movement during sudden vehicle deceleration.

Any suitable clamp member can be used to accomplish the foregoing operations, the major requirement being that it be adapted for location anywhere along the length of the vertical run 20 below the door post anchorage 26, and be operable to constrain the belt runs against relative movement. Also, for proper operation and convenience of use, the device should be mounted solely to the seatbelt runs, free of any attachment to fixed structure of the vehicle such as the door post 28.

Various modifications and changes may be made with regard to the foregoing detailed description without departing from the spirit of the invention.

What is claimed is:

1. In combination with a vehicle seatbelt which extends in a substantially vertical run from an outside anchorage on one side of a vehicle seat to a door post anchorage, and which then extends in a diagonal run from the door post anchorage to a buckle means adapted for detachable connection to an inside anchorage on the other side of the vehicle seat, an improved deflection device for shortening the diagonal run and disposing it at a greater angle relative to the vertical run to suit the seatbelt to a smaller seat occupant, the deflection device comprising:

clamping means operative to fixedly clamp the diagonal run to the vertical run below the door post anchorage at a location which is selected to dispose the diagonal run at a desired angle relative to the vertical run, the clamping means in operation being freely movable relative to fixed structure of the vehicle, the clamping means preventing the diagonal run from moving relative to the vertical run at the location of the clamping means.

2. A deflection device according to claim 1 wherein the outside anchorage comprises a retractor means operative to store excess seat belt, and further operative to pay out excess seat belt to conform to the size of the seat occupant and to permit relatively slow forward leaning by the occupant, and wherein the clamping means is operative to prevent such paying out by constraining the diagonal run against movement relative to the vertical run.

3. A deflection device according to claim 1 wherein the clamping means includes a laterally opening passageway whereby it can be laterally fitted about the vertical and diagonal runs of the seat belt with the vertical and diagonal runs in overlying relation within the passageway.

4. A deflection device according to claim 1 wherein the clamping means includes a frame and a cam member actuable to grip the seat belt between the frame and cam member.

5. A deflector device according to claim 1 wherein the clamping means includes a pair of frame members and hinge means pivotally connecting the frame members for movement between an open position in which the diagonal and vertical runs are laterally receivable between the frame members, and a closed position in which the frame members engage the runs, respectively, the clamping means further including threaded means on one of the frame members opposite the location of the hinge means, and operative upon the frame members to forcibly urge them together.

6. A deflector device according to claim 1 wherein the seat belt includes a lap run extending from the buckle means to a lap belt anchorage adjacent the outside anchorage.

7. A deflection device according to claim 6 wherein the lap run constitutes a continuation of the diagonal run and is freely slidable relative to the buckle means.

8. In combination with a vehicle seat belt which extends in a substantially vertical run from an outside anchorage on one side of a vehicle seat to a door post anchorage, and which then extends in a diagonal run from the door post anchorage to a buckle means adapted for detachable connection to an inside anchorage on the other side of the vehicle seat, an improved deflection device for shortening the diagonal run and disposing it at a greater angle relative to the vertical run to suit the seatbelt to a smaller seat occupant, the deflection device comprising:

clamping means including a frame defining a laterally open passageway for laterally receiving the vertical and diagonal runs in overlying relation, the clamping means further including a member movable into the passageway into engagement with one of the runs to fixedly clamp the runs against relative movement, the clamping means being located at a height which disposes the diagonal run at a desired angle relative to the vertical run, the clamping means in operation being attached solely to the seat belt free of any attachment to fixed structure of the vehicle.

* * * * *